United States Patent [19]

Hill, Jr. et al.

[11] 3,827,068

[45] July 30, 1974

[54] APPARATUS FOR PHOTOGRAPHING PIPELINE INTERIORS

[75] Inventors: Thomas Burton Hill, Jr.; Arthur Legrand Pendrey, both of Salem, Oreg.

[73] Assignee: Salem Sand and Gravel Company, Salem, Oreg.

[22] Filed: Dec. 11, 1972

[21] Appl. No.: 313,802

[52] U.S. Cl. .......................................... 95/11 UW
[51] Int. Cl. ........................................ G03b 17/08
[58] Field of Search .................................. 95/11 HC

[56] References Cited
UNITED STATES PATENTS
2,909,975  10/1959  Ulrich ........................... 95/11 HC
3,621,767  11/1971  Hyser ............................ 95/11 HC
3,667,359   6/1972  Watts ............................ 95/11 HC

*Primary Examiner*—John M. Horan
*Attorney, Agent, or Firm*—Oliver D. Olson

[57] ABSTRACT

One or more laterally adjustable light support float units each is retractable for passage through a sewer manhole and is expandable to the interior transverse dimension of the pipeline, and supports a light for illuminating interior areas of the pipeline to be photographed. A camera and electrical power supply support float unit also is provided, and the support units are interconnected by flexible lines for passage of the assembled apparatus through curved areas of the pipeline and for spacing the lights relative to the camera. Laterally adjustable stabilizer means is provided for the camera and power supply support float unit. In one embodiment this stabilizer means comprises a pair of laterally and longitudinally collapsible outboard floats. In another embodiment the stabilizer means comprises a pair of laterally adjustable guide wheels extending from opposite sides of the float unit. Operation of the camera is radio controlled from a remote position outside the pipeline sequentially during progress of the apparatus through the pipeline.

17 Claims, 13 Drawing Figures

PATENTED JUL 30 1974  3,827,068
SHEET 1 OF 3
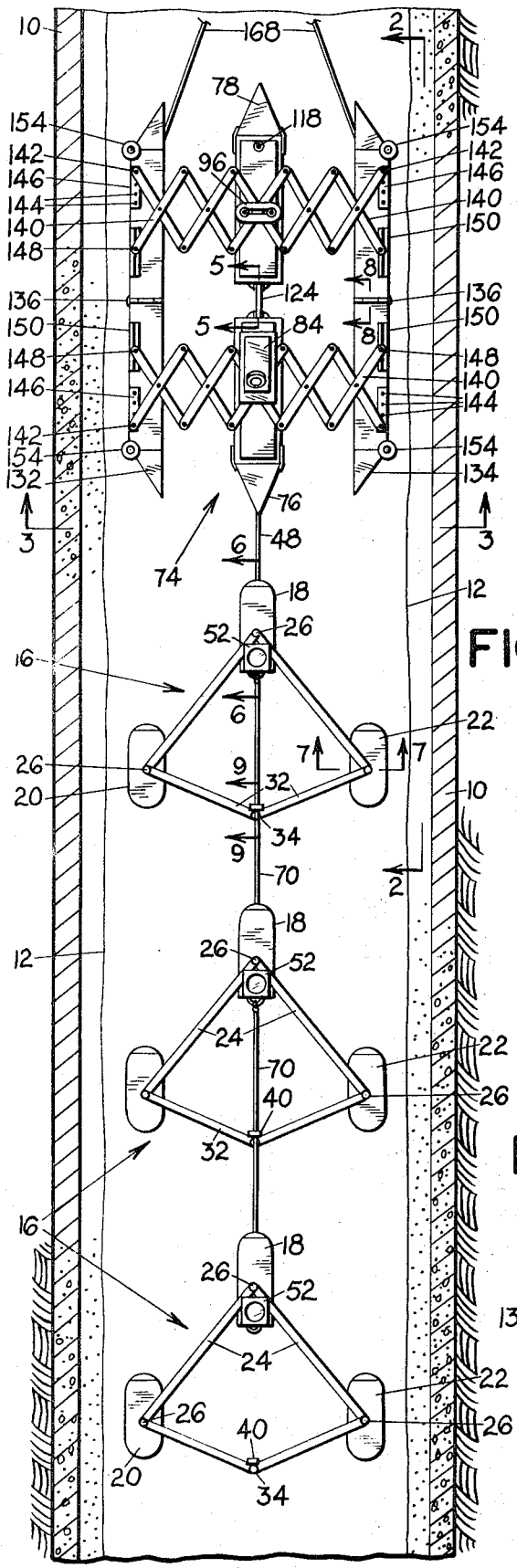
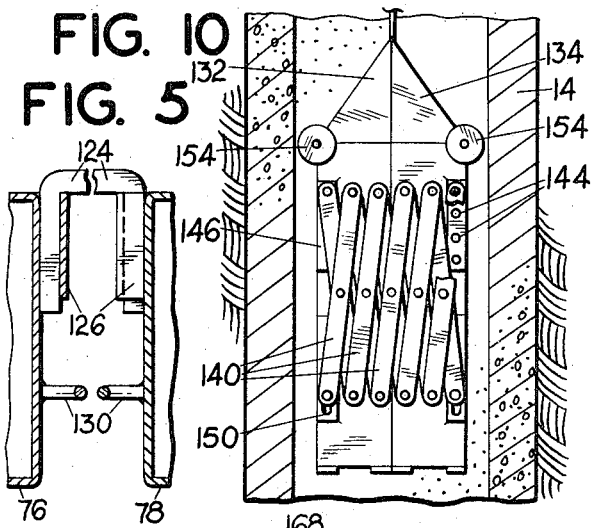
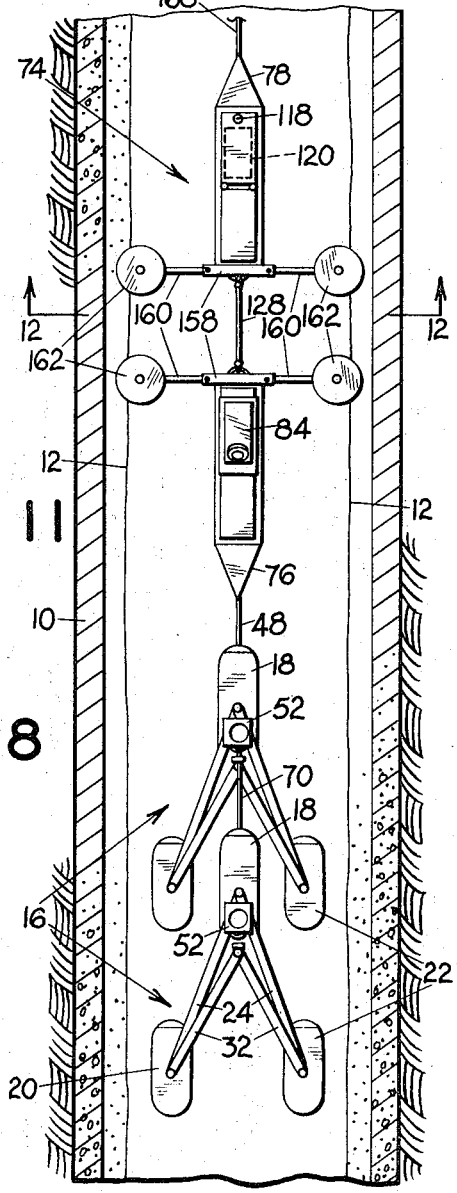
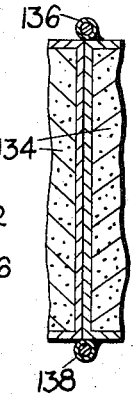

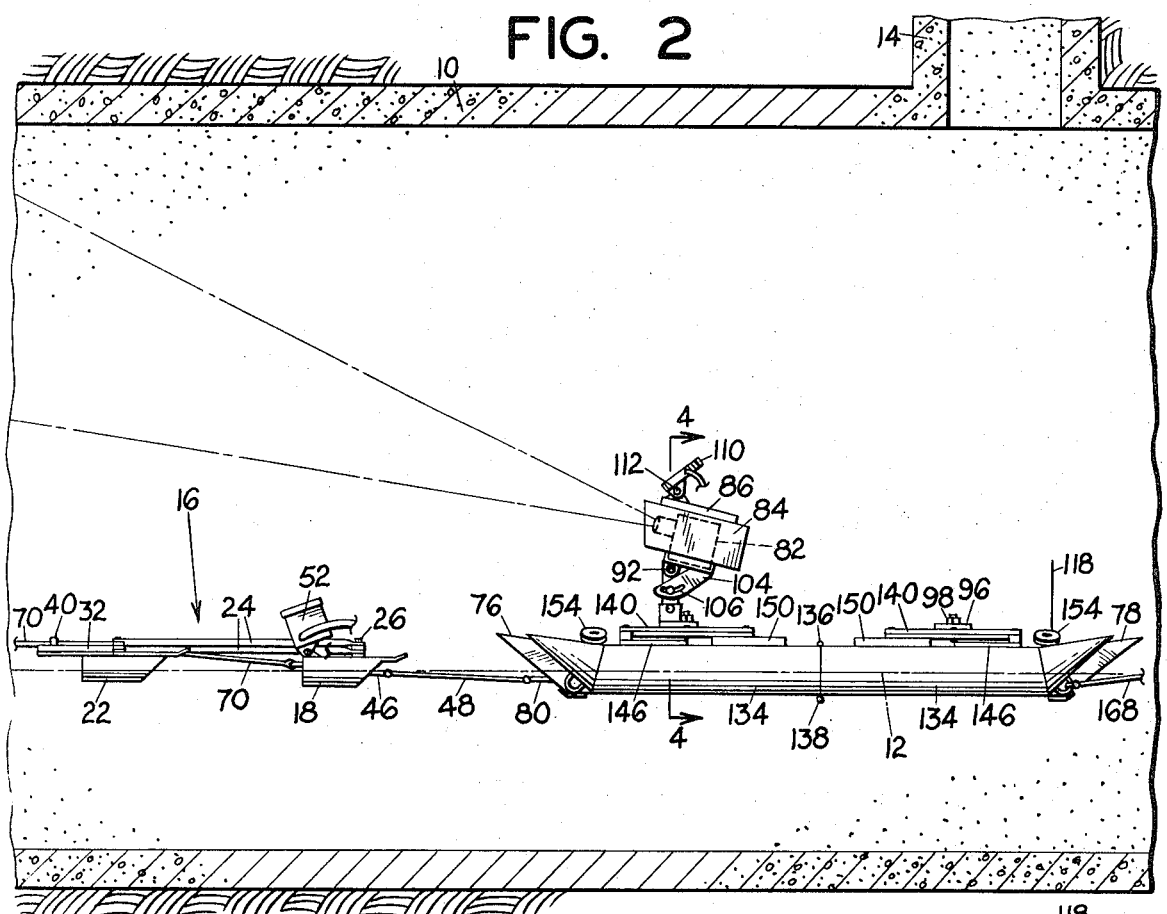
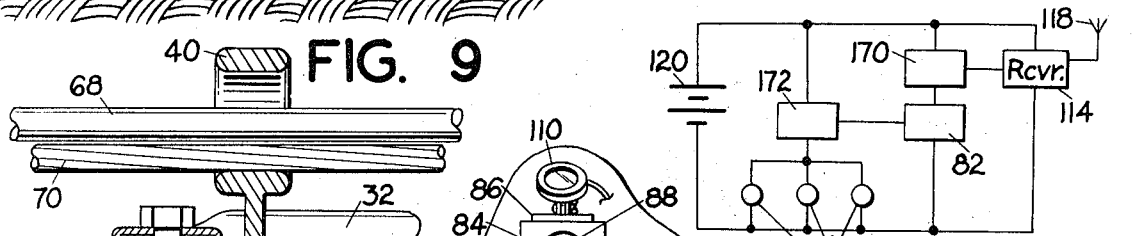
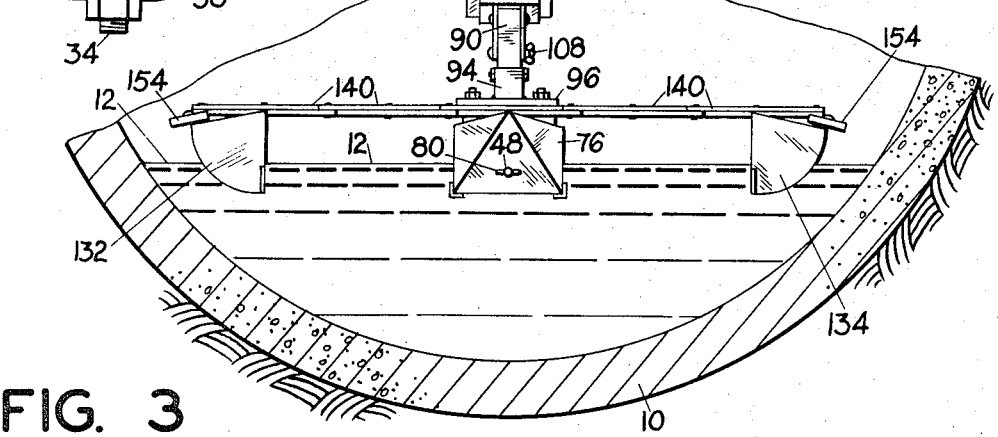

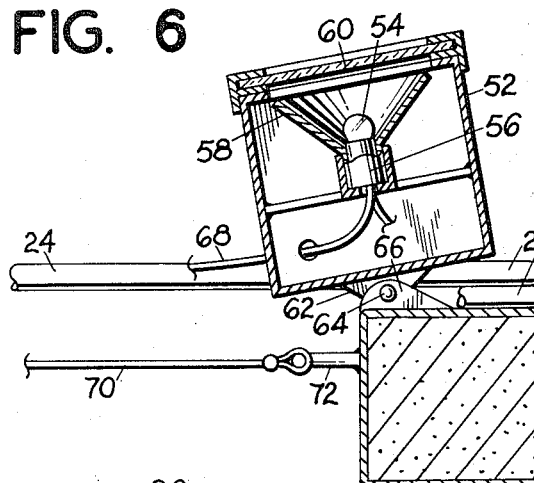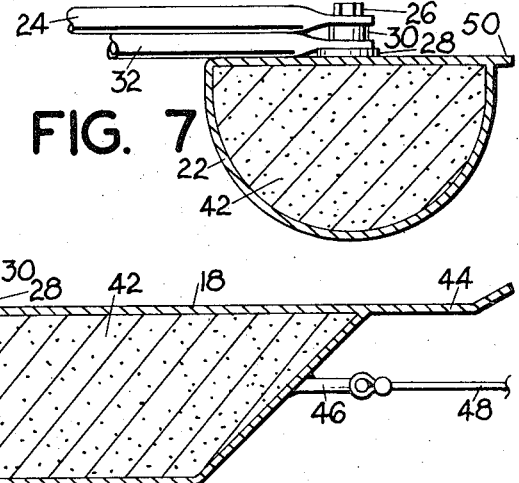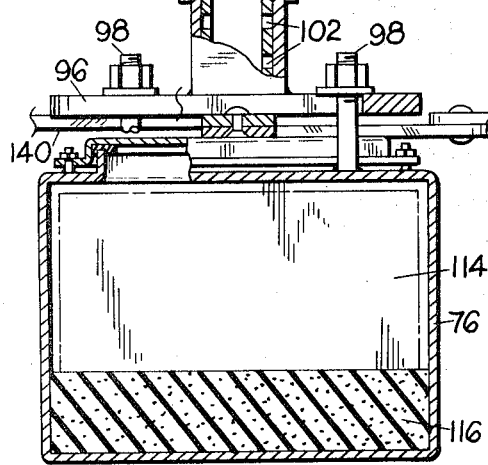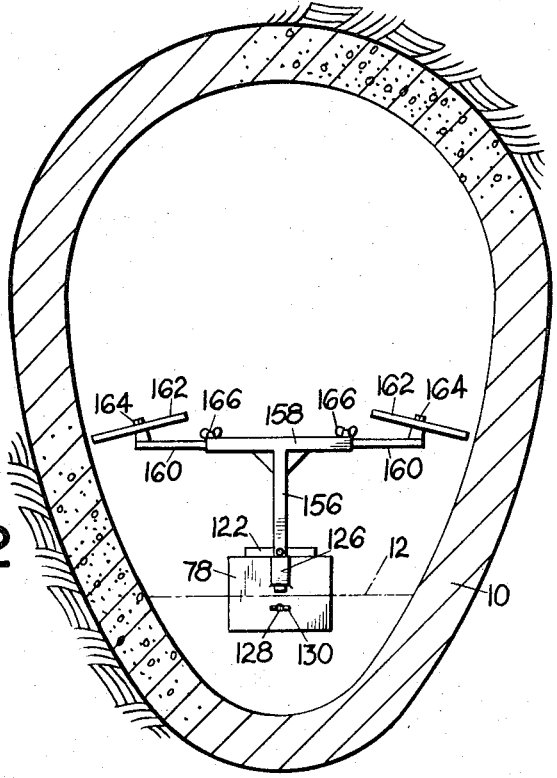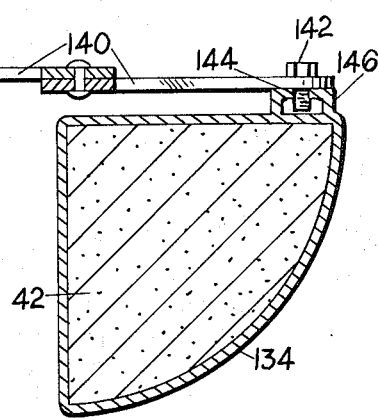

APPARATUS FOR PHOTOGRAPHING PIPELINE INTERIORS

BACKGROUND OF THE INVENTION

This invention relates to the photographing of the interiors of pipe lines for identifying and recording areas of deterioration for subsequent repair, and more particularly to apparatus for floating camera and lighting equipment upon liquid in a pipeline and for photographing areas of the latter sequentially from a remote position outside the pipeline as the apparatus progresses through the pipeline.

Visual inspection of the interiors of pipelines, particularly sewer lines, at periodic intervals of time for identifying areas of deterioration which require repair, has been accepted procedure for quite some time. Initially, such visual inspection was accomplished by personnel walking the sewer line and noting areas of deterioration. This disagreeable precedure was excessively costly and provided no permanent, accurate record for reference. Closed circuit television systems, with portable cameras and lights being carried through the pipeline by personnel, also has been tried. This procedure is equally disagreeable to such personnel and time consuming in performance. It also involves the high cost of television equipment and requires extremely long electrical conductors which must be carried through the pipeline.

The flotation of camera and lighting equipment also has been utilized heretofore. However, the flotation apparatus has not provided sufficient stability to produce photographic records of adequate resolution, and the camera and lighting equipment has required the use of extremely long electrical conductor lines for extension through the pipeline to enable operation of the equipment manually from a remote position outside the pipeline.

These and other factors heretofore have contributed to ineffective inspection of pipelines at excessively high cost.

SUMMARY OF THE INVENTION

In its basic concept, this invention provides apparatus for photographing pipeline interiors, which apparatus includes an assembly of flotation units capable of collapsing for passage through a manhole and expansion to the interior transverse dimension of the pipeline for maximum stability of camera and lighting equipment supported thereby, the camera and lighting equipment being operable by radio control from a remote position outside the pipeline.

It is by virtue of the foregoing basic concept that the principal objective of this invention is achieved; namely, to overcome the aforementioned disadvantages of prior inspection procedures and apparatus.

Another important object of this invention is the provision of apparatus of the class described which is collapsible to small cross sectional dimension and expandable over a relatively wide range of dimensions, for use in a wide variety of types and sizes of pipelines.

A further important object of this invention is the provision of apparatus of the class described which accommodates the adjustment of spacings between camera and lights over a relatively wide range, for most effective photographing of the interiors of pipelines of various types and sizes.

The foregoing and other objects and advantages of this invention will appear from the following detailed description, taken in conjunction with the accompanying drawings of preferred embodiments.

BRIEF DESCRIPTION OF THE DRAWINGS

FIG. 1 is a fragmentary plan view, partly in section, showing apparatus embodying the features of this invention in operative position in a sewer pipeline.

FIG. 2 is a fragmentary longitudinal section taken on the line 2—2 in FIG. 1.

FIG. 3 is a fragmentary transverse section taken on the line 3—3 of FIG. 1.

FIG. 4 is a fragmentary, foreshortened transverse section taken on the line 4—4 in FIG. 2.

FIG. 5 is a fragmentary, foreshortened longitudinal section taken on the line 5—5 in FIG. 1.

FIG. 6 is a fragmentary longitudinal sectional taken on the line 6—6 in FIG. 1.

FIG. 7 is a fragmentary transverse section taken on the line 7—7 in FIG. 1.

FIG. 8 is a fragmentary longitudinal section taken on the line 8—8 in FIG. 1.

FIG. 9 is a fragmentary longitudinal section taken on the line 9—9 in FIG. 1.

FIG. 10 is a fragmentary vertical elevation, partly in section, showing the outboard float components of FIG. 1 in retracted and folded position, with the camera afloat component removed, for passage through a manhole.

FIG. 11 is a fragmentary plan view, partly in section, of a modified assembly showing the camera support component in operative position, with the outboard float component of FIG. 1 replaced by laterally extending guides, for use of the apparatus in pipe lines in relative small diameter.

FIG. 12 is a transverse sectional view taken on the line 12—12 in FIG. 11.

FIG. 13 is a schematic diagram of an electrical circuit incorporating a camera and lights and control components therefor.

DESCRIPTION OF THE PREFERRED EMBODIMENTS

The apparatus of this invention is illustrated in the drawings in cooperative association with a sewer pipeline 10 containing sewage water to a normal level 12 and provided at suitably spaced intervals along its length with a manhole 14 (FIG. 2) by which to gain access to the interior of the pipeline. Although the pipeline illustrated in FIG. 1 is circular in cross section and that of FIG. 11 is oval in cross section, it will be understood that the cross sectional shape and internal transverse dimension encountered in various sewer systems may vary to a great extent.

Referring now primarily to FIG. 1 of the drawings, the apparatus of this invention includes one or more light support flotation units 16, there being three such units illustrated. Each unit includes a central hollow float 18 and a pair of outboatd stabilizing floats 20 and 22 disposed laterally outward to opposite sides of the center float. The center float is connected pivotally to the outboard floats by means of a pair of elongated link members 24, herein illustrated as being elongated structural tubes (FIG. 6). One end of both link members are connected pivotally to the center float by means of a clamping screw 26 having threaded connection with a projecting boss 28 on the top plate of the float. An annular spacer 30 encircles the screw between the adjacent flattened ends of the link members, to space the latter apart and to provide friction surfaces by which the link member may be secured together in any desired angular relationship, by tightening of the screw.

The ends of the pair of link members 24, opposite the ends connected to the centr float, and one end of a second cooperating pair of link members 32, are connected pivotally one of each of the pair of outboard floats, preferably by a similar assembly of clamping screw 26, threaded boss 28 and annular spacer 30 (FIG. 7).

The ends of the second pair of link members 32, opposite the ends connected to the outboard floats, are connected together pivotally by means of a clamping bolt 34 (FIG. 9) which extends through aligned openings in the flattened ends and surrounding the shank of the bolt is an annular spacer 36. This spacer supports, as by welding, one end of an angularly bent shank 38 the opposite end of which supports an annular guide eyelet 40.

As previously mentioned, the three floats of a unit 16 are hollow to provide buoyancy. In the preferred embodiment illustrated, each of the floats is filled with styrofoam or other suitable expanded synthetic resin 42, to insure buoyancy in the event the float develops a leak.

Each of the floats preferably is provided with an extension 44 (FIG. 6) of its top wall projecting from the end of the float facing opposite the direction of movement of sewage water through the pipeline, i.e., the upstream end, the extension thus serving as a splash guard. The upstream end of the float also is angled in the downstream direction from the upper side of the float to the bottom side thereof, to further minimize splashing. Said angled upstream end of the float mounts a connector eyelet 46 by which to connect one end of a flexible cable 48 or other form of line. In similar manner, the downstream end wall of the center float also supports an eyelet for the connection of another flexible line.

The outer longitudinal side of each of the outboard floats also preferably is provided with an outwardly projecting flange 50 (FIG. 7) which serves to slidably engage the inner wall of a pipeline and thus protect the shell of the float from excessive wear.

The center float serves to support a high intensity light, suitable for photographic purposes. In the embodiment illustrated, such a light includes a hollow housing 52 (FIG. 6) containing a lamp 54 mounted in a lamp socket 56 and provided with a reflector 58 facing a transparent window 60 mounted removably on the outer end of the housing. A suitable watertight seal is provided between the housing and window, as will be understood.

The bottom end of the housing 52 supports a projecting flange 62 which is coupled pivotally, by means of a pivot pin 64, to a bracket 66 projecting upward from the downstream end of the float. The angular position of the light thus may be adjusted over a relatively wide range.

Elongated flexible electric conductors 68 connect the lamp sockets 56 of the lights associated with each of the flotation units 16 to a source of electric potential described hereinafter. The electrical conductors extend through the guide eyelets 40 described hereinbefore (FIG. 9), which eyelets also receive the flexible lines 70 extending from a connector eyelet 72 (FIG. 6) at the downstream end of the center float 18 of one unit to the connector eyelet 46 at the upstream end of the center float of an adjacent downstream unit. The guide eyelet 40 thus serves to confine the lines 70 and conductors 68 against lateral displacement and consequent entanglements or other damage.

The pair of outboard floats 20 and 22 (FIG. 1) of each unit 16 serves to stabilize the center float 18 against lateral tilting and to maintain the center float substantially on the central vertical plane of the pipeline 10. In this manner the light carried by the center float is maintained properly directed to the overhead area of the interior of the pipeline to be illuminated for photographing.

The pair of outboard floats are adjustable laterally relative to the center float to accommodate use of the apparatus in pipelines of various diameters. Such adjustment is achieved by loosening the clamping screws 26 and bolt 34 to enable angular adjustments of the pairs of links, after which the clamping screws and bolt are again tightened to secure the adjustment. The lateral spacing is selected such that the outer side flanges 50 are spaced slightly inward of the adjacent sides of the pipeline.

It is to be noted that, upon loosening of the clamping bolt 34 and adjustment of the angle between the pair of links 32, the guide eyelet 40 is maintained properly aligned with the flexible line 70 and electrical conductor 68.

A variety of adjustments of the pairs of link members may be made for varying the spacing between the pair of outboard floats. Thus, the adjustment illustrated in FIG. 1 provides nearly maximum spacing between the outboard floats, as required for a pipeline of relatively large diameter. In FIG. 11 the spacing between the outboard floats is shortened considerably by pivoting the second pair of link members 32 toward the center float 18 of the associated unit. This permits use of a shorter length of connecting line 70 between the center floats of adjacent units, with consequent shortening of the distance between adjacent lights, as may be required for photographing the interior of smaller diameter pipeline. On the other hand, if it is desired to lengthen the spacing between adjacent lights in the smaller diameter pipeline, the same spacing between the outboard floats of each unit shown in FIG. 11 may be achieved by pivoting the second pair of link members 32 in the downstream direction, i.e., further away from the associated center float 18 than the position illustrated in FIG. 1. Such an adjustment accommodates the use of a greater length of connecting line 70 between the center floats of adjacent units, and consequent greater spacing between adjacent lights.

The apparatus of this invention also includes a float unit 74 for supporting an electrically actuated camera and a source of electric potential and control for the camera and the lights. In the embodiment illustrated, this unit comprises a pair of hollow floats 76 and 78 interconnected in longitudinal alignment. The downstream float 76 (assuming the assembly is to move downward through the pipe in FIG. 1) is provided on its sloping downstream end wall with a connector eyelet 80 (FIG. 2) for connection of the end of the flexible line 48 opposite the end connected to the center float 18 of the adjacent light flotation unit 16.

One of the floats, the float 76 illustrated, supports from its upper side a camera 82 (FIGS. 2 and 4) suitable for photographing the interiors of pipelines. Many types of cameras suitable for this purpose are available commercially from many sources. Illustrative of such cameras is the Mark IV-24 of Coleman Engineering Co., Inc. of Santa Ana, Calif.

In the embodiment illustrated, the camera is mounted in a hollow housing 84 provided with a removable lid 86 fitted with a liquid tight seal. The front of the housing includes a transparent window 88 with which the camera lens is aligned.

The camera housing is mounted on the float for vertical and angular adjustment. This is achieved in the embodiment illustrated (FIGS. 2 and 4) by means of an elongated post 90 connected pivotally at its upper end to the housing by means of a pivot pin 92 extending through aligned openings in the post and a pair of spaced ears depending from the housing. The lower end of the post is received within a socket 94 projecting upward from a clamp plate 96 which is secured to the float by means of clamp bolts 98 secured to and extending upwardly from the upper wall of the float. The socket is provided with a transverse opening for the reception of a bolt 100. A plurality of vertically spaced, registering pairs of openings 102 through the bottom end portion of the post 90 is adapted to register selectively with the transverse opening in the socket, by appropriate vertical adjustment of the post. The bolt 100 then is extended through the aligned openings for securing the post in the selected position of vertical adjustment relative to the socket. The camera thus is secured in desired position of elevation relative to the float, as will be understood.

Angular adjustment of the camera relative to the float is afforded by pivoting the housing 84 relative to the post 90 about the axis of the pivot pin 92. A pair of locking plates 104 extend from the bottom of the housing adjacent opposite sides of the post, and are provided with arcuate slots 106 (FIG. 2) the common center of which is the axis of the pivot pin 92. A hole through the post is located in alignment with the arcuate slots, for the reception of a locking bolt 108 which functions to secure the housing in the desired position of angular adjustment relative to the float.

If desired, an additional light 110 may be mounted on the housing lig 86 for pivotal adjustment by means of a pivot pin 112.

The hollow interior of the float 76 serves to contain a radio frequency receiver 114 (FIG. 4), suitably protected by support upon sponge rubber or other desired buffer material 116. Although the receiving antenna 118 may be mounted on the same float, it is preferably mounted on the associated float 78 in order to be spaced as far as practicable from the electrical control for the camera. Suitable electrical connection is provided between the receiver and antenna, as will be understood.

The other float 78 of the camera and power supply flotation unit 74 is of similarly hollow construction, the interior of which serves to contain a suitable battery source 120 (FIGS. 11 and 13) of electrical potential for the camera and lights and for the control mechanism therefor. For this purpose an opening is provided in the upper wall of the float for access to the power supply for maintenance and replacement. A removable cover 122 is provided for closing the opening.

Means is provided for interconnecting the pair of floats 76 and 78 in longitudinal alignment. In the embodiment illustrated in FIG. 1, such means is provided by a U-shaped connector 124 (FIG. 5) the spaced legs of which are of non-circular cross section for removable reception in corresponding shaped sockets 126 projecting from the facing end walls of the pair of floats. The connector thus secures the pair of floats together rigidly in axial alignment.

In FIG. 11, the pair of floats 76 and 78 are interconnected by means of a flexible line 128 connected at its opposite ends to eyelets 130 projecting from the facing end walls of the pair of floats. This flexible connector thus joins the pair of floats together in axial alignment, but permits the floats to move angularly relative to each other, as required to traverse curved areas of the relatively small diameter pipeline.

Means is provided for stabilizing the float unit 74 for the camera and power supply against lateral tilting and for maintaining the unit centered with the pipeline, for the same purposes as described hereinbefore in connection with the light flotation units 16. In the embodiment illustrated in FIG. 1, the stabilizing means comprises a pair of hollow, preferably resin-filled, outboard floats 132 and 134 located on opposite lateral sides of the central float unit 74. Each of the outboard floats preferably is formed of two independent sections joined together in longitudinal extension by means of transverse hinges 136 and 138 (FIG. 8) extending across the top and bottom walls, respectively, of the sections. One component of each hinge is connected to one of the sections and the other component of each hinge is connected to the adjacent section. The hinge pins are removable, allowing each hinge to be uncoupled. Thus, by removing the hinge pin of one of the hinges, the two sections may be folded longitudinally against each other by pivoting about the opposite, retained hinge pin. However, by securing both hinges with their associated pins, the two sections of the outboard float are secured together rigidly as an integral unit.

The pair of outboard floats 132 and 134 are joined together and to the center float unit 74 in such manner as to afford lateral adjustment of the outboard floats relative to the center float unit. In the embodiment illustrated in FIG. 1, this is achieved by means of an assembly of crossed and pivotally interconnected link members 140 arranged in the manner of a lazy tongs. In the embodiment illustrated, there is such a lazy tongs arrangement interconnecting each section of one outboard float with the corresponding section of the opposite outboard float. The terminal end of one of the link members of each lazy tongs is connected pivotally to the associated float section by a clamp screw 142 (FIG. 4) which is threaded into a desired one of a plurality of longitudinally spaced, threaded openings 144 in a plate 146 secured to the float section.

The corresponding terminal end of the associated link member is coupled to the associated float section for longitudinal sliding adjustment. This is provided in the embodiment illustrated by a guide bolt 148 (FIG. 1) the head of which is confined slidably in the slot of an elongated guide plate 150 of C-shaped cross section. The shank of the guide bolt thus extends upward through the elongated slot in the guide plate and through an opening in the terminal end portion of the link member. The upwardly projecting threaded portion of the bolt is fitted with a clamp nut which, upon tightening, functions to secure the link member to the guide plate. Upon loosening of the clamp nut, the lazy tongs assembly may be extended or retracted, as desired, to lengthen or shorten the spacing between the pair of outboard floats. The maximum extension of the lazy tongs assembly may be varied by appropriate selection of the threaded openings 144 for the clamp screw 142.

Means is provided on each of the outboard floats 132 and 134 for spacing the latter inwardly of the interior wall of the pipeline 10 and thus prevent abrasive wear of the floats. In the embodiment illustrated, an idler guide wheel 154 is mounted on a shaft adjacent each end of each float for projection of the wheel laterally outwardly beyond the float sufficiently to engage the interior wall of the pipe line and thus space the float therefrom.

Each of the lazy tongs assemblies illustrated is connected releasably to the associated center float section. As best shown in FIG. 4, this is achieved by extending the lazy tongs assembly over the associated center float section and clamping it to the latter releasably by means of the clamp plate 96.

Referring now to FIG. 11 of the drawings, stabilization of the camera and power supply float unit cannot be achieved by use of the outboard float assembly illustrated in FIG. 1, because the small diameter of the pipeline will not accommodate the outboard assembly. Accordingly, the latter is replaced by the stabilizing assembly best illustrated in FIG. 12. Thus, a T-shaped support member is mounted by its vertical leg 156 in the connector socket 126 (FIG. 5) on the facing ends of each of the float sections. The cross sectional shape of the leg is of the same non-circular cross sectional shape of the socket, to prevent axial rotation of the support member. The cross arm 158 of the support member is hollow, to receive slidably through its opposite ends a pair of transverse arms 160 the outer ends of which support guide wheels 162 for rotation about the axes of their mounting shafts 164. The arms are secured to the cross arm in desired positions of extension therefrom by means of set screws 166 preferably provided with wing nut heads for convenience of manipulation.

The arms 160 are extended from the cross arm of the support member sufficiently to position the guide wheels 162 slightly inward of the opposite interior walls of the pipe line 10, as illustrated. The guide wheels thus maintain the float unit 74 centered within the pipe line and minimize lateral tilting of the float unit, as will be understood.

From the foregoing, it will be appreciated that the component units of the apparatus are collapsible to small compass sufficiently to pass through a manhole 14 of a sewer pipeline 10. The degree of collapsing required is dependent, of course, upon the diameter of the manhole. The minimum diameter manhole is 18 inches, these being found in the older types of sewer systems. Currently installed sewer systems are provided with manholes having a diameter of at least 24 inches. However, the light float units 16 are collapsible sufficiently to pass through a manhole of 18 inch diameter, as is the float unit 74 for the camera and power supply. However, in the preferred dimensional construction of the outboard float assembly of FIG. 1, the fully retracted position of the outboard floats against the opposite sides of the center float unit does not permit passage through an 18 inch diameter manhole, but does allow passage through a 24 inch diameter manhole.

Accordingly, in order for the apparatus assembly of FIG. 1 to pass through an 18 inch diameter manhole, the outboard floats and lazy tongs assemblies are disconnected from the center float unit, by removal of the clamp plate 96 (FIG. 4). The outboard float assembly then is collapsed to the minimum dimensions illustrated in FIG. 10. Further, if required, the sections of each outboard float are folded together, by removing one of the hinge pins 136 and 138 as previously described. The collapsed and folded assembly then is capable of passage through the 18 inch diameter manhole.

It will be understood that after the components of the apparatus have been introduced into the pipeline, they are then reassembled in appropriate manner, as illustrated in FIGS. 1 and 11.

In operation, the assembled apparatus within the pipeline is connected by an elongated cable 168 which extends therefrom outward through a manhole to a manually operated or powered winch (not shown) appropriately located adjacent the manhole. The apparatus may be floated on the sewage water within the pipeline, either downstream with the flow of water by controlled pay-out of the cable, or upstream countercurrent to the flow of water by controlled winding in of the cable onto the winch.

A photograph of the interior surface of the pipeline is taken at intervals of movement of the apparatus through the pipeline, for example, at intervals of 5 feet. In the preferred embodiment illustrated, operation of the photographic equipment is effected by radio control from a suitably remote position outside the pipeline. Such radio control eliminates the cost of excessive lengths of electrical conductors and the potential problems of entanglements and malfunctions incident to their use.

Thus, the radio receiver 114 functions upon activation by a radio frequency signal received at the antenna 118 from a transmitter (not shown) located at a remote position outside the pipeline, to produce an electrical output signal which functions to activate a control switch mechanism 170 (FIG. 13) in the electric circuit of the battery power supply 120 for the camera 82. Upon activation of the camera, an internal control switch 172 is activated to complete the electric circuit of the battery supply for the lights 54 carried by the light flotation units 16 to provide illumination for the photograph. After a suitable time delay, provided internally by the camera to effect energization of the lights, the camera shutter is operated to expose the film. Then, after a predetermined time delay, mechanism within the camera is activated to advance the film one frame, preparatory to a subsequent exposure.

Stepwise movement of the apparatus through the pipeline through predetermined distances may be controlled in various ways. For example, the elongated cable 168 connecting the apparatus to the winch, may be marked with visible indicia at the prescribed intervals of length. As each indicia becomes visible sequentially to the operator, the latter activates the transmitter to initiate the photographing sequence previously described.

Alternatively, such visible markings on the cable may be scanned by automatic means, such as a photoelectric cell, to provide automatic sequential operation of the transmitter.

From the foregoing it will be appreciated that the apparatus of the present invention is versatile in its utility, being adjustable to accommodate pipelines of diverse shapes and transverse dimensions, is collapsible to dimensions capable of passing through the smallest of manholes, provides complete stability for camera equipment and thus insures maximum fidelity of photographic records, is operable by radio control from a remote position outside the pipeline, and is of simplified construction for economical manufacture, ease of transport and speed of assembly and disassembly.

It will be apparent to those skilled in the art that various changes may be made in the details of construction described hereinbefore without departing from the spirit of this invention.

Having now described our invention and the manner in which it may be used, we claim:

1. Apparatus for photographing pipeline interiors, comprising:
   a. camera flotation means arranged to float upon liquid in a pipeline and to support a camera for photographing areas of pipeline interiors,
   b. light flotation means arranged to float upon liquid in a pipeline and to support a light for illuminating areas of pipeline interiors to be photographed,
   c. means coupling the camera and light flotation means together in longitudinally spaced relation, and
   d. stabilizing means engaging the camera and light flotation means for maintaining the flotation means substantially centered laterally and upright upon liquid in the pipeline.

2. The apparatus of claim 1 wherein the camera flotation means includes means for supporting an electrical power supply for electrically actuated camera and lighting equipment.

3. The apparatus of claim 2 wherein the camera flotation means includes means for supporting a radio receiver for receiving a radio frequency control signal from a transmitter located remotely from the pipeline, the radio receiver functioning upon activation by the control signal to produce an electric output signal for activating the camera and lighting equipment.

4. The apparatus of claim 1 wherein the camera flotation means comprises a pair of float members, and means interconnecting the float members in longitudinal alignment.

5. The apparatus of claim 4 wherein the interconnecting means comprises a rigid connector securing the float members together releasably in rigid, longitudinal alignment.

6. The apparatus of claim 4 wherein the interconnecting means comprises a flexible connector securing the float members together for independent angular movement.

7. The apparatus of claim 1 wherein the light flotation means comprises a light-supporting member, and the stabilizing means for the light flotation means comprises a pair of outboard float members disposed on opposite lateral sides of the light-supporting float member, and link means interconnecting the float members for adjusting the lateral spacing between the outboard float members.

8. The apparatus of claim 1 wherein the stabilizing means for the camera flotation means comprises a pair of outboard float members disposed on opposite sides of the camera flotation means, and adjustable connecting means interconnecting the outboard float members and camera flotation means for lateral adjustment of the outboard float members to varying distances on opposite sides of the camera flotation means.

9. The apparatus of claim 8 wherein the adjustable connecting means comprises a lazy tongs member connected at its opposite ends to the outboard float members and intermediate its ends to the camera flotation means.

10. The apparatus of claim 8 wherein each outboard float member includes a pair of longitudinal sections hinged together releasably for folding one against the other.

11. The apparatus of claim 8 wherein
   a. the camera flotation means comprises a pair of float members, and means interconnecting the float members in longitudinal alignment,
   b. each outboard float member includes a pair of longitudinal sections hinged together releasably for folding one against the other, and
   c. the adjustable connecting means comprises a pair of lazy tong members each connected at its opposite ends to one section of each of the outboard float members and intermediate its ends to one of the pair of float members of the camera flotation means.

12. The apparatus of claim 1 wherein the stabilizing means for the camera flotation means comprises a support member mounted on the camera flotation means, and a pair of laterally spaced guide wheels mounted on the support member for lateral adjustment to varying distances on opposite sides of the camera flotation means.

13. The apparatus of claim 1 wherein
   a. the camera flotation means comprises a pair of float members, and means interconnecting the float members in longitudinal alignment, and
   b. the stabilizing means for the camera flotation means comprises a support member mounted on each float member of the camera flotation means, and a pair of laterally spaced guide wheels mounted on each support member for lateral adjustment to varying distances on opposite sides of the associated float member of the camera flotation means.

14. The apparatus of claim 1 wherein the means coupling the flotation means together comprises flexible line means.

15. The apparatus of claim 1 including a plurality of said light flotation means and stabilizer means therefor, and a plurality of flexible line means interconnecting the plurality of light flotation means in longitudinally spaced relation.

16. The apparatus of claim 1 wherein
   a. the camera flotation means includes means for supporting an electrical power supply for electrically actuated camera and lighting equipment,
   b. the camera flotation means also includes means for supporting a radio receiver for receiving a radio frequency control signal from a transmitter located remotely from the pipeline, the radio receiver functioning upon activation by the control signal to produce an electric output signal for activating the camera and lighting equipment, c. the stabilizing means for the camera flotation means comprises a pair of outboard float members disposed on opposite sides of the camera flotation means, and adjustable connecting means interconnecting the outboard float members and camera flotation means for lateral adjustment of the outboard float members to varying distances on opposite sides of the camera flotation means, and d. the light flotation means comprises a light-supporting float member, and the stabilizing means for the light flotation means comprises a pair of outboard float members disposed on opposite lateral sides of the light-supporting float member, and e. link means interconnecting the float members for adjusting the lateral spacing between the outboard float members.

17. The apparatus of claim 1 wherein a. the camera flotation means includes means for supporting an electrical power supply for electrically actuated camera and lighting equipment, b. the camera flotation means includes means for supporting a radio receiver for receiving a radio frequency control signal from a transmitter located remotely from the pipeline, the radio receiver functioning upon activation by the control signal to produce an electric output for activating the camera and lighting equipment, c. the stabilizing means for the camera flotation means comprises a support member mounted on the camera flotation means, and a pair of laterally spaced guide wheels mounted on the support member for lateral adjustment to varying distances at opposite sides of the camera flotation means, and d. the light flotation means comprises a light-supporting float member, and the stabilizing means for the light flotation means comprises a pair of outboard float members disposed on opposite lateral sides of the light-supporting float member, and link means interconnecting the float members for adjusting the lateral spacing between the outboard float members.

* * * * *